E. T. BARLOW.
Screw-Wrench.

No. 198,264.  Patented Dec. 18, 1877.

Witnesses
Jno. L. Boone
Geo. H. Strong.

Inventor
Elisha T. Barlow
by Dewey & Co.
attys.

UNITED STATES PATENT OFFICE.

ELISHA T. BARLOW, OF SAN FRANCISCO, CALIFORNIA.

IMPROVEMENT IN SCREW-WRENCHES.

Specification forming part of Letters Patent No. 198,264, dated December 18, 1877; application filed November 10, 1877.

*To all whom it may concern:*

Be it known that I, ELISHA T. BARLOW, of the city and county of San Francisco, and State of California, have invented an Improvement in Screw-Wrenches; and I do hereby declare the following description and accompanying drawings are sufficient to enable any person skilled in the art or science to which it most nearly appertains to make and use my said invention without further invention or experiment.

The object of my invention is to combine the movable jaw and screw of a screw-wrench with a movable nut, which can be quickly adjusted to different points in the length of the wrench-shank and fixed in place by a simple device, as hereinafter described, so that it will only be necessary to use the screw for moving the jaw against the device to be seized from the position in which the nut is fixed.

Figure 1:
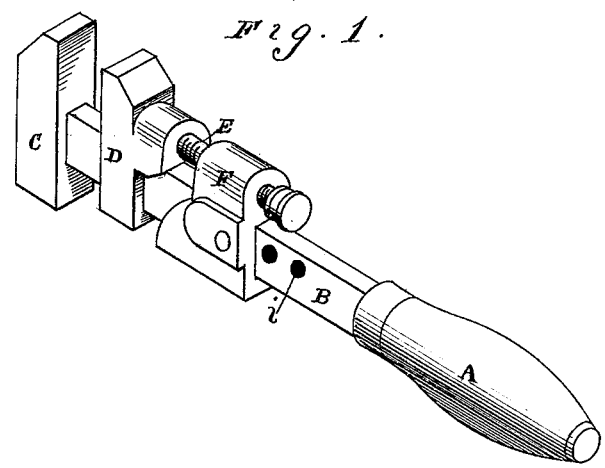
Figure 2:
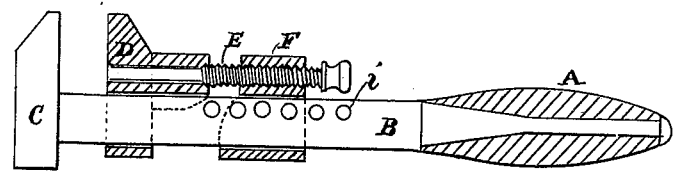
Figure 3:
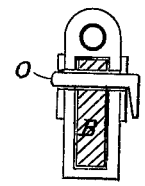

Referring to the accompanying drawings, Figure 1 is a perspective view. Fig. 2 is a longitudinal section.

Let A represent the handle, B the shank, and C the fixed jaw, of a hand-wrench.

The movable jaw D, I arrange to slide upon the shank B, in the usual way; but instead of connecting the screw E, which adjusts it on the shank, with a fixed nut near the handle, I connect the screw with a movable nut, F.

This nut is arranged to move along the shank in the same manner that the movable jaw moves along it; but I provide a means for fixing it firmly at any point in the length of the shank, so that after it is once fixed the screw can be used for griping the jaw upon the device to be seized.

At different points in the length of the shank, wherever I think it may be desirable to fix the movable nut, I make a transverse hole, $i$, and I provide the movable nut F with a pin, O, which passes through that portion of the nut which surrounds the shank.

Now, when I want to adjust the movable jaw to any particular position with reference to the fixed jaw, I move the nut E to the hole $i$ nearest that point, and force the pin O through the hole, thus fixing the nut at that point. I then complete the adjustment of the movable jaw by means of the screw E, in the ordinary manner of adjusting the movable jaw of a screw-wrench. To readjust the nut I withdraw the pin, move the nut to the desired point, and again fasten, as above.

By this improvement I save much of the time heretofore required to set the movable jaw. The screw in my wrench merely serves for tightening the jaws upon the device which it is to grasp; and, besides this, the screw, being short, is less liable to be bent, or twisted, or jammed than if it were long.

Having thus described my invention, what I claim is—

A screw-wrench consisting of a fixed jaw, C, shank B, provided with a series of transverse holes, $i$, and handle A, in combination with a movable jaw, D, connected by a screw, E, with a movable nut, F, having a pin, O, and which can be adjusted and fixed at any desired point in the length of the shank, substantially as above described.

In witness whereof I have hereunto set my hand and seal.

ELISHA T. BARLOW. [L. S.]

Witnesses:
   GEO. B. HITCHCOCK,
   J. L. BOONE.